United States Patent
Ribu et al.

(10) Patent No.: US 11,643,259 B2
(45) Date of Patent: May 9, 2023

(54) PACKAGING MATERIAL WITH BARRIER PROPERTIES

(71) Applicant: Stora Enso OYJ, Helsinki (FI)

(72) Inventors: Ville Ribu, Lappeenranta (FI); Paula Hirsilä, Lapeenranta (FI); Kaj Backfolk, Villmanstrand (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/762,681

(22) PCT Filed: Nov. 8, 2018

(86) PCT No.: PCT/IB2018/058762
§ 371 (c)(1),
(2) Date: May 8, 2020

(87) PCT Pub. No.: WO2019/092623
PCT Pub. Date: May 16, 2019

(65) Prior Publication Data
US 2021/0171259 A1 Jun. 10, 2021

(51) Int. Cl.
*B65D 65/40* (2006.01)
*B32B 27/08* (2006.01)
(Continued)

(52) U.S. Cl.
CPC ............. *B65D 65/40* (2013.01); *B32B 27/08* (2013.01); *B32B 27/10* (2013.01); *B32B 27/306* (2013.01);
(Continued)

(58) Field of Classification Search
CPC ....... B32B 27/08; B32B 27/10; B32B 27/306; B32B 27/34; B32B 27/32; B32B 27/327
See application file for complete search history.

(56) References Cited

U.S. PATENT DOCUMENTS 3,775,239 A   11/1973   Snow
3,904,806 A    9/1975   Waggoner
(Continued)

FOREIGN PATENT DOCUMENTS

EP   0120624 A2   10/1984
EP   0241819 A2   10/1987
(Continued)

OTHER PUBLICATIONS

Zhang et al., "Permeation of Oxygen and Water Vapor Through EVOH Films as Influenced by Relative Humidity", 2001, Journal of Applied Polymer Science, vol. 82, pp. 1866-1872 (Year: 2001).*
(Continued)

*Primary Examiner* — Zachary M Davis
(74) *Attorney, Agent, or Firm* — Greer, Burns & Crain, Ltd.

(57) ABSTRACT

The present invention is directed to a packaging material, more specifically a packaging material having gas and/or moisture barrier properties, wherein the material comprises a barrier material comprising a layer comprising at least 50% of a zinc ionomer, a layer of polyethylene and a layer that forms a gas barrier. The invention is also directed to packaging products using said barrier material. Such products are in particular packages suitable for cosmetics and personal care products.

19 Claims, 1 Drawing Sheet

(51) Int. Cl.
  *B32B 27/10* (2006.01)
  *B32B 27/30* (2006.01)
  *B32B 27/32* (2006.01)
  *B32B 27/34* (2006.01)
  *C08L 23/06* (2006.01)

(52) U.S. Cl.
  CPC .......... *B32B 27/308* (2013.01); *B32B 27/32* (2013.01); *B32B 27/34* (2013.01); *C08L 23/06* (2013.01); *B32B 2250/05* (2013.01); *B32B 2307/31* (2013.01); *B32B 2307/718* (2013.01); *B32B 2307/7244* (2013.01); *B32B 2307/7246* (2013.01); *B32B 2553/00* (2013.01)

(56) References Cited

U.S. PATENT DOCUMENTS

| | | |
|---|---|---|
| 4,615,926 A | 10/1986 | Hsu et al. |
| 4,835,025 A | 5/1989 | Thompson et al. |
| 5,356,676 A | 10/1994 | von Widdern et al. |
| 6,682,825 B1 | 1/2004 | Kennedy et al. |
| 8,642,144 B2 | 2/2014 | Curie et al. |
| 2010/0151218 A1 | 6/2010 | Curie et al. |
| 2014/0075895 A1 | 3/2014 | O'Connor |

FOREIGN PATENT DOCUMENTS

| | | | |
|---|---|---|---|
| EP | 0341937 A2 | 11/1989 | |
| EP | 0352127 A2 | 1/1990 | |
| EP | 0397510 A2 | 11/1990 | |
| EP | 2386411 A1 | 11/2011 | |
| GB | 2529904 A * | 3/2016 | ............ B32B 23/08 |
| JP | S5022078 A | 3/1975 | |
| JP | S5567831 U | 5/1980 | |
| JP | S5828352 A | 2/1983 | |
| JP | H04212839 A | 8/1992 | |
| JP | H05305660 A | 11/1993 | |
| WO | 2012008145 A1 | 1/2012 | |
| WO | 2017163167 A1 | 9/2017 | |
| WO | 2019123238 A1 | 6/2019 | |

OTHER PUBLICATIONS

Supplemental European Search Report from corresponding European application No. EP 18 87 6273, completed on Jun. 22, 2021.

* cited by examiner

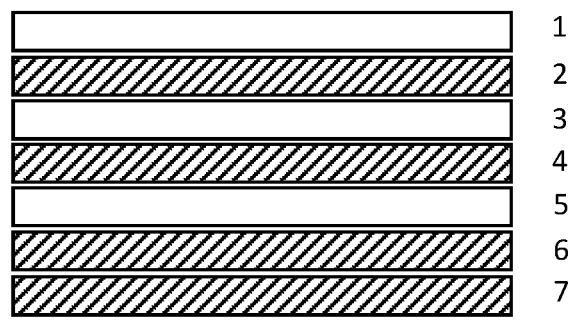

PACKAGING MATERIAL WITH BARRIER PROPERTIES

This application is a U.S. National Phase under 35 U.S.C. § 371 of International Application No. PCT/IB2018/058762, filed Nov. 8, 2018, which claims priority under 35 U.S.C. §§ 119 and 365 to Swedish Application No. 1751391-2, filed Nov. 10, 2017.

TECHNICAL FIELD

The present invention is directed to a packaging material, more specifically a packaging material having gas and/or moisture barrier properties, wherein the material comprises a barrier material of a layer comprising at least 50% of a zinc ionomer, a layer of polyethylene and a layer that forms a gas barrier. The invention is also directed to packaging products using said barrier material. Such products are in particular packages suitable for cosmetics and personal care products.

BACKGROUND

When packaging material is to be used for products such as cosmetics that may be sensitive, contain oily substances and contain a high proportion of water or moisture, aluminium is typically used to provide adequate barrier properties.

To manufacture a more sustainable and aluminium free barrier material suitable for use in these types of applications, several technical problems need to be addressed. Firstly, the gas and moisture permeability of the package needs to be sufficiently low. Secondly, the barrier layer needs to be sufficiently thin and flexible, heat sealable and gluable. Ideally, the material should also be sufficiently resistant to heat and be suitable for printing, such as when printing is carried out using inks containing mineral oils or with a process involving the use of mineral oils.

U.S. Pat. No. 3,775,239 is directed to a heat sealable packaging sheet material which is described as being resistant to the transmission of oils and greases.

U.S. Pat. No. 3,904,806 is directed to films prepared by melt extrusion of copolymers of ethylene with from 2 to 20% by weight of an $\alpha,\beta$-ethylenically unsaturated monocarboxylic acid onto one side of glassine paper.

There is still a need for improved barriers that have improved properties, also at high moisture content and wherein the barrier is resistant to chemicals and provides adequate gas barrier properties. There is a particular need of adequate barriers when the barrier is likely to be exposed to high humidity conditions, such as when the barrier is used in a tropical climate. There is also a particular need for barriers that can withstand aggressive chemicals, such as those found in cosmetics, coffee etc as well as greasy food, non-food liquids with a high alcohol or solvent content etc. In addition, the barrier needs to be able to function as a barrier against potential migration of volatile ink constituents, such as mineral oil.

SUMMARY OF THE INVENTION

It has surprisingly been found that by providing a material comprising a layer comprising at least 50% of a zinc ionomer, a layer of polyethylene and a layer that forms a gas barrier, particularly advantageous properties are achieved. The material according to the present invention is heat sealable and provides barrier properties in the absence of an aluminium layer. The present invention provides a barrier material having high durability and strength and is also suitable for printing carried out using for printing inks containing for example mineral oils.

Thus, the present invention is directed to a barrier material comprising a layer comprising at least 50% of a zinc ionomer, a layer of polyethylene and a layer that forms a gas barrier.

The layer that comprises at least 50% of a zinc ionomer contains at least 50% by weight, based on the weight of said layer, of zinc ionomer. Preferably, the amount of zinc ionomer in said layer is at least 60%, at least 70%, at least 80%, at least 90% or at least 95%. In addition to zinc ionomer, the layer may for example comprise other ionomers that are not zinc ionomers. The layer may also comprise fillers, clay, pigments etc.

The layer that forms a gas barrier can be defined as a layer having oxygen transmission rate (OTR) of less than 100 $cm^3/m^2*day$, preferably less than 10 $cm^3/m^2*day$ measured at standard conditions (50% RH, 23° C.), when the gas barrier is present at a grammage of 5-50 $g/m^2$. The layer that forms a gas barrier is preferably selected from EVOH (ethylene vinyl alcohol) and polyamide and a cellulose derivative or polymer such as microfibrillated cellulose (MFC), carboxy-methylcellulose (CMC), hydroxypropyl cellulose (HPS), ethylhydroxyethyl cellulose (EHEC), polyvinylidene chloride (PVDC), polyglycolic acid (PGA), polyvinyl alcohol (PVOH), cationic or anionic PVOH, ethylated PVOH, silanolated PVOH or hydroxyethylcellulose (HEC) or a combination thereof. This layer is typically coated or laminated as a film. The grammage of the layer may be 0.5-50 $g/m^2$, such as 0.5-20 $g/m^2$ or 5-20 $g/m^2$. The gas barrier may be a single layer or multiple layers. When microfibrillated cellulose is used in the gas barrier as a film, the grammage thereof is preferably 5-50 $g/m^2$, and having an OTR value of less than 10000, preferably less than 5000, more preferably less than 1000 $cm^3/m^2*day$, measured at standard conditions. It has been found that advantageous barrier properties can be achieved when MFC is combined with for example polyethylene in accordance with the present invention.

The OTR value of the barrier material according to the present invention is less than 20 $cm^3/m^2*day$ when the barrier material is present at a gram mage of 30-200 $g/m^2$.

The barrier material according to the present invention may be laminated or extruded onto one or two sides of a substrate. The substrate may for example be a paper or board substrate.

The paper or board substrate may also be treated by corona treatment and/or flame treatment prior to the barrier material according to the present invention being laminated or extruded onto it.

When laminating or extruding the barrier material according to the present invention onto a substrate, the substrate may be provided with a separate moisture barrier, which may be a layer of polyethylene provided between the board substrate and the barrier material according to the present invention.

The barrier material according to the present invention may optionally also contain an aroma barrier which may be provided in addition to the layer that forms a gas barrier.

To further improve the properties of the barrier material, a tie layer may be provided between the zinc ionomer layer and the gas barrier and/or between the polyethylene layer and the zinc ionomer.

The barrier material according to the present invention may also comprise additives. Examples of additives include fillers such as nanocellulose fibers, nanocrystalline cellulose, pigments such as $TiO_2$, $CaCO_3$, nanoclays, talc etc. Other additives that may used include additives that adjust for example optical, electrical, rheological, chemical or mechanical properties. Such additives are known in the art and may incorporated into the barrier material according to the present invention.

BRIEF DESCRIPTION OF THE FIGURES

FIG. 1 illustrates a barrier material, comprising a layer of a zinc ionomer (1), a layer of polyethylene (3) and a layer that forms a gas barrier (5). An optional tie layer (2) may be provided between the zinc ionomer layer and the gas barrier. An optional tie layer (4) may be provided between the polyethylene layer (3) and the layer that forms a gas barrier (5). Optionally, the barrier material may be laminated or extruded onto a paper or board substrate (7). Optionally, a layer of polyethylene (6) and/or tie layer may be provided between the barrier and the paper or board substrate and a tie layer may optionally be provided between the layer that forms a gas barrier (5) and the optional layer of polyethylene (6). The layer of polyethylene (6) could also be comprised of two or more layers.

DETAILED DESCRIPTION

The present invention is directed to a barrier material comprising a layer of a zinc ionomer, a layer of polyethylene and a layer that forms a gas barrier.

The zinc ionomer can for example be a zinc ionomer commercially available as Surlyn, such as Surlyn 1702-1 or Surlyn 1652. Preferably, the barrier material according to the present invention has one single layer comprising zinc ionomer.

The layer that forms a gas barrier is preferably selected from EVOH, polyamide and a cellulose derivative or polymer such as microfibrillated cellulose (MFC), carboxymethylcellulose (CMC), hydroxypropyl cellulose (HPS), ethylhydroxyethyl cellulose (EHEC) or hydroxyethylcellulose (HEC) or a combination thereof. When the barrier material is free standing, i.e. not extruded on or laminated onto a substrate, the layer that forms a gas barrier may be provided with a protective layer. The protective layer may for example be a layer of polyethylene.

Each layer of the barrier material has a weight in the range of 5-50 $g/m^2$, preferably 8-40 $g/m^2$, more preferably 10-35 $g/m^2$ except any tie layer which has a weight in the range of 2-20 $g/m^2$, preferably 4-10 $g/m^2$. The total weight of the barrier material is preferably in the range of 30-200 $g/m^2$, more preferably in the range of 30-140 $g/m^2$, most preferably in the range of 40-120 $g/m^2$.

A preferred embodiment of the present invention is a barrier material having:
one single layer comprising at least 50% of a zinc ionomer;
at least one layer of polyethylene; and
one single layer that forms a gas barrier.

A more preferred embodiment of the present invention is a barrier material having:
one single layer that has a weight in the range of 5-50 $g/m^2$ comprising at least 50% of a zinc ionomer;
at least one layer of polyethylene; and
one single layer that forms a gas barrier.

The barrier material is preferably extruded on or laminated onto a substrate.

The substrate is preferably a paper or board substrate.

Examples of structures are the following:
Zinc ionomer/polyethylene/tie layer/gas barrier, such as zinc ionomer/polyethylene/tie layer/EVOH or zinc ionomer/polyethylene/MFC
Zinc ionomer/tie layer/polyethylene/gas barrier, such as zinc ionomer/tie layer/polyethylene/EVOH or zinc ionomer/tie layer/polyethylene/MFC
Zinc ionomer/polyethylene/tie layer/gas barrier, such as zinc ionomer/polyethylene/tie layer/EVOH or zinc ionomer/polyethylene/tie layer/MFC
Zinc ionomer/tie layer/gas barrier, wherein the tie layer is polyethylene based resin.
and the following:
Polyethylene/zinc ionomer/gas barrier, such as polyethylene/zinc ionomer/EVOH or polyethylene/zinc ionomer/MFC
Polyethylene/zinc ionomer/tie layer/gas barrier, such as polyethylene/zinc ionomer/tie layer/EVOH or polyethylene/zinc ionomer/tie layer/MFC Further structures according to the present invention include the following:
Zinc ionomer/tie layer/polyethylene/tie layer/EVOH/tie layer/polyethylene
Zinc ionomer/tie layer/EVOH
Polyethylene/zinc ionomer/tie layer/EVOH Thus, when the barrier layers have been extruded on or laminated onto a substrate such as a board substrate the structures may be as follows:
Zinc ionomer/tie layer/polyethylene/tie layer/EVOH/tie layer/polyethylene/board
Zinc ionomer/tie layer/EVOH/board
Polyethylene/zinc ionomer/tie layer/EVOH/board The barrier layer may be provided on a paper or board substrate, optionally with a layer of polyethylene or polypropylene provided between the barrier layer and the paper or board substrate. The polyethylene used may be low-density polyethylene (LDPE), high-density polyethylene (HDPE), medium-density polyethylene (MDPE) or a mixture thereof.

The barrier layer according to the present invention can be manufactured by laminating or extruding together each layer of the barrier material. The barrier material may extruded on a substrate such as a board or, alternatively, extruded as a film and laminated onto a substrate such as a board.

The barrier layer according to the present invention can also be provided with a heat-sealing layer on the zinc ionomer, i.e. on top of (1) in FIG. 1. The heat-sealing layer confers heat-sealing properties. If a heat-sealing layer is provided, it may be provided in the form of LLDPE and blends of it. Further, the heat-sealable layer may be provided in the form of EPE (Ethylene alpha-olefin resin/Ethene copolymer) or ULDPE, ULDPE copolymer (such as ULDPE/Hexene copolymer), EMA, EVA, Elastomer, Plastomer, or blend of these and/or blend with LDPE.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

Example

A material as described below was sealed as a bag containing a test solution (make up) inside the bag. The bag was stored in 45° C./85% RH conditions to perform an accelerated shelf life test. The bag was weighed to measure weight loss from the bag. The weight loss indicates the amount of liquid lost from the bag through evaporation, i.e. the lower the weight loss the lower the gas permeability of the material.

Materials:
Sample 1: 10 $g/m^2$ Surlyn 1702 and 15 $g/m^2$ polyethylene
Sample 2: 10 $g/m^2$ Surlyn 1802 (sodium ionomer) and 15 $g/m^2$ polyethylene
Sample 3: 75 $g/m^2$ polyethylene
Sample 4: 56 $g/m^2$ EVOH-based barrier Weight loss in % was determined after 11 days for samples 1, 3, and 4. For sample 2, weight loss in % was determined after 10 days. The following results were achieved:

Weight loss, %

| | |
|---|---|
| Sample 1 | 6.0 |
| Sample 2 | 11.9 |
| Sample 3 | 16.6 |
| Sample 4 | 8.1 |

In view of the above detailed description of the present invention, other modifications and variations will become apparent to those skilled in the art. However, it should be apparent that such other modifications and variations may be effected without departing from the spirit and scope of the invention.

The invention claimed is:
1. A barrier material consisting essentially of:
a single layer comprising at least 50% of a zinc ionomer,
a layer of polyethylene, and
a layer that forms a gas barrier, wherein the layer that forms a gas barrier is formed from a material selected from the group consisting of: a combination of EVOH and one or more of polyglycolic acid (PGA), polyvinyl alcohol (PVOH), cationic or anionic PVOH, ethylated PVOH, or silanolated PVOH; a combination of a cellulose derivative or polymer and polyglycolic acid (PGA); or a combination of polyamide and one or more of a cellulose derivative or polymer, polyglycolic acid (PGA), polyvinyl alcohol (PVOH), cationic or anionic PVOH, ethylated PVOH, or silanolated PVOH,
optionally a second layer of polyethylene, or a tie layer, or a heat-sealing layer between the single layer comprising at least 50% of the zinc ionomer and the layer of polyethylene, or between the layer of polyethylene and the layer that forms the gas barrier, on a side of the layer that forms the gas barrier opposite the layer of polyethylene, or combinations thereof,
wherein the single layer comprising at least 50% of the zinc ionomer forms an outer layer of the barrier material, and wherein the layer of polyethylene is located between the single layer comprising at least 50% of the zinc ionomer and the layer that forms the gas barrier, and wherein each layer of the barrier material has a weight in the range of 5-50 $g/m^2$, and wherein the oxygen transmission rate of the barrier material is below 20 cm$^3$/m$^2$*day at 50% RH, 23° C.

2. The barrier material according to claim 1, wherein there is a tie layer between the layer of polyethylene and the layer that forms a gas barrier, or between the layer comprising at least 50% zinc ionomer and the layer that forms a gas barrier, or between both.

3. The barrier material according to claim 1, wherein each layer of the barrier material has a weight in the range of 8-40 g/m$^2$.

4. The barrier material according to claim 3, wherein each layer of the barrier material has a weight in the range of 10-35 g/m$^2$.

5. The barrier material according to claim 1, wherein the barrier material comprises a single layer that forms the gas barrier.

6. The barrier material according to claim 5, wherein the total weight of the barrier material is in the range of 30-200 g/m$^2$.

7. The barrier material according to claim 1, wherein there is a tie layer and wherein the tie layer has a weight in the range of 2-20 g/m$^2$.

8. The barrier material according to claim 7, wherein the tie layer has a weight in the range of 4-10 g/m$^2$.

9. The barrier material according to claim 1 wherein there is a second layer of polyethylene positioned on a side of the layer that forms the gas barrier opposite the layer of polyethylene.

10. The barrier material according to claim 9 wherein there is a tie layer between the layer that forms the gas barrier and the second layer of polyethylene.

11. The barrier material according to claim 1 wherein the cellulose derivative or polymer comprises microfibrillated cellulose (MFC), carboxy-methylcellulose (CMC), hydroxypropyl cellulose (HPS), ethylhydroxyethyl cellulose (EHEC), or hydroxyethylcellulose (HEC), or combinations thereof.

12. The barrier material according to claim 1 wherein the heat-sealing layer is polyethylene.

13. The barrier material according to claim 1 wherein the single layer comprising at least 50% of a zinc ionomer further comprises a second ionomer which is not zinc.

14. The barrier material according to claim 1 wherein the layer that forms the gas barrier is formed from the material selected from the group consisting of: a combination of EVOH and polyglycolic acid (PGA), polyvinyl alcohol (PVOH), cationic or anionic PVOH, ethylated PVOH, silanolated PVOH, or combinations thereof.

15. The barrier material according to claim 14 wherein the cellulose derivative or polymer comprises microfibrillated cellulose (MFC), carboxy-methylcellulose (CMC), hydroxypropyl cellulose (HPS), ethylhydroxyethyl cellulose (EHEC), or hydroxyethylcellulose (HEC), or combinations thereof.

16. The barrier material according to claim 1 wherein the layer that forms a gas barrier is formed from a material selected from the group consisting of: the combination of the cellulose derivative or polymer and polyglycolic acid (PGA).

17. A packaging material comprising a barrier material according to claim 1.

18. The packaging material according to claim 17, wherein the barrier material has been laminated or extruded onto a paper or board substrate.

19. A barrier material consisting essentially of:
a single layer comprising at least 50% of a zinc ionomer,
a layer of polyethylene, and
a layer that forms a gas barrier, wherein the layer that forms a gas barrier is formed from a material selected from the group consisting of the combination of polyamide and one or more of a cellulose derivative or polymer, polyglycolic acid (PGA), polyvinyl alcohol (PVOH), cationic or anionic PVOH, ethylated PVOH, or silanolated PVOH,
optionally a second layer of polyethylene, or a tie layer, or a heat-sealing layer between the single layer comprising at least 50% of the zinc ionomer and the layer of polyethylene, or between the layer of polyethylene and the layer that forms the gas barrier, on a side of the layer that forms the gas barrier opposite the layer of polyethylene, or combinations thereof,
wherein the single layer comprising at least 50% of the zinc ionomer forms an outer layer of the barrier material, and wherein the layer of polyethylene is located between the single layer comprising at least 50% of the zinc ionomer and the layer that forms the gas barrier, and wherein each layer of the barrier material has a weight in the range of 5-50 g/m$^2$, and wherein the oxygen transmission rate of the barrier material is below 20 cm$^3$/m$^2$*day at 50% RH, 23° C.

* * * * *